(12) United States Patent
Hazama

(10) Patent No.: US 6,434,397 B1
(45) Date of Patent: Aug. 13, 2002

(54) COMMUNICATION CHANNEL SELECTION METHOD AND MOBILE COMMUNICATION APPARATUS

(75) Inventor: Kaori Hazama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/350,281

(22) Filed: Jul. 9, 1999

Related U.S. Application Data

(63) Continuation of application No. PCT/JP98/04839, filed on Oct. 26, 1998.

(51) Int. Cl.[7] .................................................. H04Q 7/20
(52) U.S. Cl. ....................... 455/515; 455/450; 455/452; 455/464
(58) Field of Search ................................. 455/403, 422, 455/450, 452, 12.1, 427, 430, 513, 514, 464

(56) References Cited

U.S. PATENT DOCUMENTS

| 5,257,400 A | * | 10/1993 | Yoshida | 455/434 |
| 5,280,630 A | * | 1/1994 | Wang | 455/62 X |
| 5,418,839 A | * | 5/1995 | Knuth et al. | 455/464 |
| 5,452,471 A | * | 9/1995 | Leopold et al. | 455/12.1 |
| 5,640,677 A | * | 6/1997 | Karlsson | 455/452 |
| 5,898,928 A | * | 4/1999 | Karlsson et al. | 455/450 |
| 5,953,665 A | * | 9/1999 | Mattila | 455/434 |
| 6,021,314 A | * | 2/2000 | Magana et al. | 455/62 |
| 6,067,442 A | * | 5/2000 | Wiedeman et al. | 455/13.1 |

FOREIGN PATENT DOCUMENTS

| EP | 0836289 | 4/1998 |
| JP | 746642 | 2/1995 |
| JP | 8139662 | 5/1996 |
| JP | 9215040 | 8/1997 |
| JP | 10126833 | 5/1998 |

* cited by examiner

Primary Examiner—Nay Maung
(74) Attorney, Agent, or Firm—Rothwell, Figg, Ernst & Manbeck

(57) ABSTRACT

When a mobile communication apparatus detects a communication channel in a good channel state, the identification information on a system side communication apparatus providing the communication channel is extracted and stored in relation to the communication channel. At the time of channel switching, a stored communication channel having identification information coincident with the identification information on a communication channel being acquired is selected in preference to other communication channels, whereby the channel search can be completed in a short time.

14 Claims, 10 Drawing Sheets

FIG. 2

| ADDRESS | FREQUENCY | TIMING SLOT |
|---|---|---|
| 1 | F1 | T1 |
| 2 | F1 | T2 |
| 3 | F1 | T3 |
| 4 | F2 | T4 |
| 5 | F2 | T5 |
| 6 | F3 | T1 |
| 7 | F3 | T2 |
| 8 | F3 | T3 |
| 9 | F3 | T4 |
| 10 | F3 | T5 |
| 11 | F4 | T1 |
| 12 | F4 | T3 |
| 13 | F4 | T5 |
| ⋮ | ⋮ | ⋮ |

FIG. 3A

| ADDRESS | IDENTIFICATION INFORMATION |
|---|---|
| 1 | D1 |
| 2 | D3 |
| 3 | — |
| 4 | D1 |
| 5 | — |
| 6 | D2 |
| 7 | — |
| 8 | — |
| 9 | — |
| 10 | — |
| 11 | D2 |
| 12 | D1 |
| 13 | — |
| ⋮ | ⋮ |

FIG. 3B

| ADDRESS | IDENTIFICATION INFORMATION | CORRESPONDING ADDRESS |
|---|---|---|
| 1 | D1 | 1 |
| 2 | D3 | 2 |
| 3 | D1 | 4 |
| 4 | D2 | 6 |
| 5 | D2 | 11 |
| 6 | D1 | 12 |
| ⋮ | ⋮ | ⋮ |

FIG. 3C

| ADDRESS | IDENTIFICATION INFORMATION | CORRESPONDING ADDRESS |
|---|---|---|
| 1 | D1 | 1 |
| 2 | D1 | 4 |
| 3 | D1 | 12 |
| 4 | D2 | 6 |
| 5 | D2 | 11 |
| 6 | D3 | 2 |
| ⋮ | ⋮ | ⋮ |

| ADDRESS | FREQUENCY | TIMING SLOT | IDENTIFICATION INFORMATION |
|---|---|---|---|
| 1 | F1 | T1 | D1 |
| 2 | F1 | T2 | D3 |
| 3 | F2 | T4 | D1 |
| 4 | F3 | T1 | D2 |
| 5 | F4 | T1 | D2 |
| 6 | F4 | T3 | D1 |
| ⋮ | ⋮ | ⋮ | ⋮ |

FIG. 10

| ADDRESS | FREQUENCY | TIMING SLOT | IDENTIFICATION INFORMATION (EARTH STATION) | IDENTIFICATION INFORMATION (COMMUNICATION SATELLITE) |
|---|---|---|---|---|
| 1 | F1 | T1 | D1 | E4 |
| 2 | F1 | T2 | D3 | E2 |
| 3 | F2 | T4 | D1 | E3 |
| 4 | F3 | T1 | D2 | E2 |
| 5 | F4 | T1 | D2 | E2 |
| 6 | F4 | T3 | D1 | E4 |
| ⋮ | ⋮ | ⋮ | ⋮ | ⋮ |

COMMUNICATION CHANNEL SELECTION METHOD AND MOBILE COMMUNICATION APPARATUS

CROSS-REFERENCE TO THE RELATED APPLICATION

This Application is a continuation of International Application No. PCT/JP98/04839, whose international filing date is Oct. 26, 1998, the disclosures of which Application are incorporated by reference therein.

BACKGROUND OF THE INVENTION

1. Field of the Invention

The present invention relates to a communication channel selection method and a mobile communication apparatus. More particularly, the present invention relates to the improvement of a communication channel selection method of selecting one radio communication channel from a plurality of radio communication channels provided by the system side and relates to the mobile communication apparatus for selecting one radio communication channel from the plurality of radio communication channels provided by the system side.

2. Description of the Background Art

A mobile communication apparatus such as a portable telephone has a channel selection section for selecting a communication channel since the apparatus is generally capable of using a plurality of radio communication channels provided by the communication system, whereby the mobile communication apparatus communicates through a communication channel selected by the channel selection section.

However, all of the communication channels are not always in a usable state. That is, even when a multiplicity of radio communication channels provided by the system side (for example, an earth station) are usable, the radio signal capable of being received by the mobile communication apparatus is limited under a particular circumstance. Accordingly, when determining a communication channel, the channel selection section is required to perform the channel search in a manner that the communication channels capable of being selected are sequentially selected thereby finding a usable communication channel, that is, a channel capable of receiving the radio signal transmitted from the system side.

The communication channel is defined by frequency and time slot in the case of a portable telephone of the TDMA (time division multiple access) system. While, the communication channel is defined by frequency and spreading code in the case of aportable telephone of the CDMA (code division multiple access) system. For example, in the system employing the GSM (global system for mobile communications) system which is one of the TDMA system, several hundred kinds of communication channels can be selected in accordance with combination of the frequencies and the time slots.

Accordingly, in the case where the channel switching is required, communication channels are sequentially selected from a channel list in which selectable communication channels are defined. And, the channel states of the selected communication channels are checked (channel search). When a communication channel in a good channel state is found, this communication channel is acquired. Thereafter, if the channel state of the acquired communication channel is degraded, the same channel search as the aforesaid channel search is executed again. In such a channel search, since communication channels are sequentially selected from the channel list, there is a case where a communication channel in a good channel state can be found through checking only a channel state of one communication channel, but there is also a case where a communication channel in a good channel state can be found for the first time through checking channel states of several hundreds of communication channels.

Although a time required for the checking operation of the channel state differs depending on the communication system, the time required for the channel search becomes in a range of several seconds to several ten seconds at maximum in the case of the communication system requiring a long time for the checking operation. If such a long time is required for the channel search, there arises a problem that a user can not immediately use the radio communication apparatus for communication, even if the user exists within a service area capable of receiving the radio signal from the system.

There has been proposed the portable telephone in which the communication channels within a channel list are grouped and the communication channels of a particular group are subjected to the checking of the channel states thereof in preference to other groups. In such a portable telephone, the channel list includes the communication channels (home channels) provided by the service company with which a user directly contracted and the communication channels (roaming channels) which are provided by other service companies and available for the same portable telephone by the roaming contract or the like, wherein the home channels and the roaming channels are memorized as separate groups. At the time of the channel search, the selection of the communication channel from the group of the home channels is performed in preference to the other groups, and the communication channel is selected from the group of the roaming channels only when none of all the hole channels is in a good channel state. In general, since the channel charge is cheaper in the home channels rather than the roaming channels, this portable telephone is arranged in a manner that the communication channels of the channel list are grouped due to the economical reason. According to such grouping of the communication channels, although the time required for the channel search can be shortened within an area where the home channels can be acquired, it takes a long time for the channel search in an outside area where the home channels can not be acquired since only the roaming channels can be acquired.

Further, there has been proposed the system where a system (for example, an earth station) transmits a radio signal including information as to the communication channels of peripheral cells. For example, in the GSM system, the channel information on the radio signal (a cell corresponding to this radio signal is referred to as a serving cell) transmitted from the earth station monitored by the mobile communication apparatus includes the frequency information on cells (referred to as neighboring cells) adjacent to the serving cell. If the frequency information on such neighboring cells is obtained in advance, even when the mobile communication apparatus moves out of the serving area, the next communication channel can be acquired by the channel search in a short time by performing the channel search only as to such neighboring cells.

One earth station generally provides a plurality of cells adjacent thereto. However, the respective neighboring cells in the GSM system are cells merely adjacent to the current serving cell. In other words, an earth station providing the respective neighboring cells is not always same as an earth station providing the serving cell. Accordingly, an earth station providing a new serving cell selected by the channel search sometimes is different from the earth station having provided the current serving cell.

However, there is a case where a cell provided by the same earth station having provided the current serving cell is selected as a new serving cell as possible. For example, when a mobile communication apparatus locates near the boundary of service areas with different charge systems, it is economical to select a communication channel provided by an earth station with cheaper charge system. Further, for example, when there is an earth station which connects only to a particular network in view of the confidence or the like of the communication, it is required to select a communication channel by discriminating an earth station providing communication channels.

In such a system, it is required at the time of switching communication channels to sequentially extract the information on an earth station, that is, the information as to the charge system with respect to selectable communication channels, thereby determining whether or not an earth station is one providing the service desired by a user. Thus, it is required for each communication channel to extract the service information and determine the condition in addition to the checking operation of the channel state, so that there arises a problem that a time required for the channel search becomes longer by such operations.

SUMMARY OF THE INVENTION

Accordingly, the present invention has been made in view of such circumstances and an object of the present invention is to provide a communication channel selecting method and a communication terminal apparatus such as a mobile communication apparatus in which identification information on an earth station are held in advance thereby selecting a communication channel desired by a user in a short time at the time of channel switching.

A communication channel selecting method according to the present invention comprises the steps of: detecting a channel state of a communication channel; extracting from a received signal identification information on a system side communication apparatus which provides the communication channel; storing on a basis of a detection result of the detecting step, the identification information extracted by the extracting step so as to to be link the identification information to the communication channel; and selecting a communication channel on a basis of the identification information stored. According to such an arrangement, at the time of channel switching, a communication channel provided by the same system side communication apparatus can be selected in preference to other communication channels.

A mobile communication apparatus according to the present invention comprises: means for detecting a channel state of a communication channel; means for extracting from a received signal identification information on a system side communication apparatus which provides said communication channel; means for storing on a basis of said detected channel state, said extracted identification information so as to link the extracted identification information to said communication channel; and means for selecting a communication channel on a basis of said identification information stored by said identification information storage means. According to such an arrangement, at the time of channel switching, a communication channel provided by the same system side communication apparatus can be selected in preference to other communication channels.

BRIEF DESCRIPTION OF DRAWINGS

FIG. 2 is a diagram showing an example of the data forming a channel list 7 shown in FIG. 1.

FIGS. 3A, 3B and 3C are diagrams showing examples of data arrangements stored in an identification information storage section 4 shown in FIG. 1.

FIG. 10 is a diagram showing another example of the data arrangement forming the channel list 7 shown in FIG. 6 (fourth embodiment).

DETAILED DESCRIPTION OF THE PREFERRED EMBODIMENTS

Figure 1:
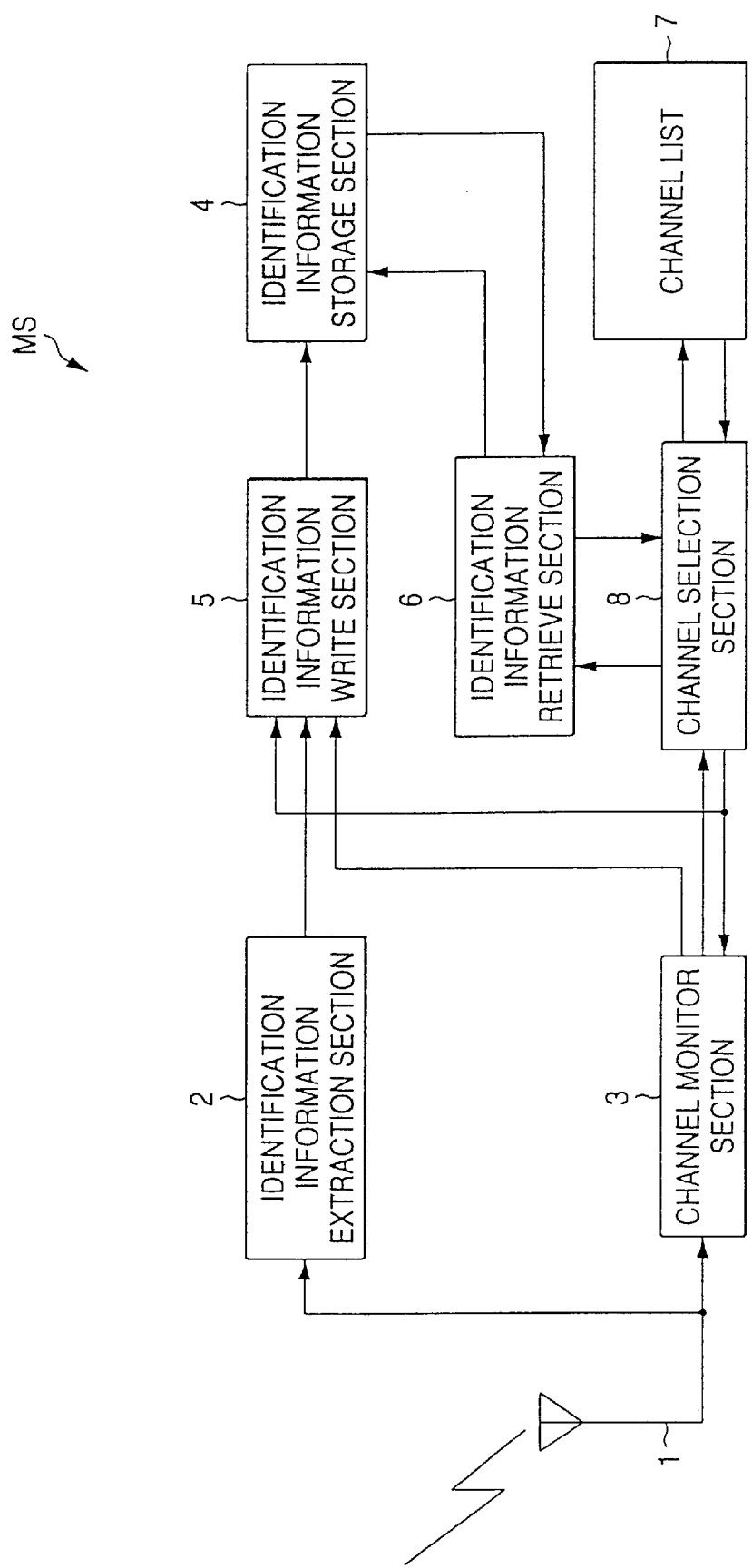
FIG. 1 is a block diagram showing one example of the arrangement of a mobile communication apparatus according to the present invention.

FIG. 1 is a block diagram showing an example of the arrangement of a mobile communication apparatus MS according to the present invention. In FIG. 1, a reference numeral 1 represents an antenna section for receiving a radio signal from a system side communication apparatus (not shown). A reference numeral 2 represents an identification information extraction section for extracting from the received signal the identification information on the system side communication apparatus. A reference numeral 3 represents a channel monitor section for monitoring the channel state of a communication channel. A reference numeral 4 represents an identification information storage section for storing the extracted identification information therein. A reference numeral 5 represents an identification information write section for writing the identification information in the identification information storage section 4. A reference numeral 6 represents an identification information retrieve section for retrieving the data within the identification information storage section 4. A reference numeral 7 represents a channel list defining selectable communication channels in advance. And, a reference numeral 8 represents a channel selection section for selecting the communication channel from the channel list 7.

The channel list 7 is stored in a storage means for storing the channel information selectable by the mobile communication apparatus MS. Usually, the list 7 may be stored in a nonvolatile storage means such as a ROM, EPROM, flash memory or the like. Alternatively, the channel list may be stored in a volatile storage means such as a DRAM, SRAM or the like in which the channel information is copied as the need arises from the nonvolatile storage means such as a hard disk, optical disk, ROM, EPROM, flash memory or the like.

FIG. 2 is a diagram showing an example of the data forming the channel list 7. There is described a case where the mobile communication apparatus MS is applied to the portable telephone of the TDMA system. The channel list 7 defines selectable several hundred kinds of communication channels formed by the combination of the carrier frequencies of the radio signal {F1, F2, F3 - - - } and the time slots {T1, T2, T3 - - - } which represents the synchronous timing.

The channel selection section 8 generates an address signal and supplies it to the channel list 7 to select a communication channel, thereby reading the frequency and the time slot of the selected communication channel. The frequency and the time slot thus read is sent to the channel monitor section 3 which in turn detects the channel state of the selected communication channel. The detection result of the channel state is binary value data representing good or bad channel state or multi-value data representing the channel state of the selected communication channel. When the detected channel state does not satisfy a predetermined quality level, the channel selection section 8 further selects another communication channel from the channel list 7.

The identification information extraction section 2 extracts the identification information on the system side communication apparatus from a received signal which is received at the time of call-waiting through a call-waiting channel, a broadcast channel or the like. The system side communication apparatus means a communication apparatus of the system side which provides the mobile communication apparatus MS with a communication channel. For example, one of the system side communication apparatus is an earth station in the case of the portable telephone system of the GSM system, and an earth station or a communication satellite in the case of the satellite communication system which communicates with the earth station through the communication satellite.

In general, the radio signal from the system side communication apparatus includes channel information. One of the channel information is an identification information on the system side communication apparatus referred to as a "service ID". For example, the identification information on the system side communication apparatus corresponds to the identification information on an earth station serving as the system side communication apparatus, the identification information on a communication satellite serving as the system side communication apparatus, the identification information on a provider which provides the communication service by the system side communication apparatus or the like. The identification information extraction section 2 extracts such identification information from the received signal and outputs it to the identification information write section 5.

The identification information write section 5 writes into an identification information storage section 4 the identification information extracted from the communication channels in a good channel state on the basis of the outputs of the identification information extraction section 2 and the channel monitor section 3. That is, in the case where the detected channel state of the communication channel is not less than the predetermined quality level (that is, the channel state is good), the identification information extracted through the communication channel by the identification information extraction section 2 is written into the identification information storage section 4.

The identification information storage section 4 is a storage means for storing the identification information having been extracted by the identification information extraction section 2 in corresponding with the communication channels through which the identification information have been extracted, respectively. The identification information storage section 4 may be realized by a writable storage means, that is, a volatile storage means such as a DRAM, SRAM or the like, or a nonvolatile storage means such as a flash memory, EPROM or the like.

FIGS. 3A, 3B and 3C are diagrams showing examples of data arrangements stored in the identification information storage section 4. In the arrangement shown in 3A, addresses of the identification information stored in the identification information storage section 4 correspond with addresses defining the communication channels within the channel list 7, respectively, so that the communication channels correspond with the identification information, respectively. For example, an identification information "D1" is linked to communication channels "F1 & T1" (address 1), "F2 & T4" (address 4) and "F4 & T3" (address 12). In FIG. 3A, a mark "-" represents that the communication channel has not been acquired and hence the corresponding identification information has not been obtained. In the arrangement shown in FIG. 3B, the identification information are stored in the identification information storage section 4 together with the corresponding addresses defining the communication channels within the channel list 7, respectively, whereby the identification information are made corresponding with the communication channels, respectively. When an amount of the identification information to be stored is small, the storage capacity required for storing the data is smaller in the case of FIG. 3B rather than the case of FIG. 3A. In the arrangement shown in FIG. 3C of this figure, the information similar to that of the case of FIG. 3B is sorted in the identification information storage section 4 but the identification information write section 5 writes the information in a different manner that the data within the identification information storage section 4 is classified at every identification information. Thus, at the time of performing the data retrieval by an identification information retrieve section 6, the data can be retrieved at a speed higher than other cases.

The identification information retrieve section 6 retrieves the identification information stored in the identification information storage section 4. In other words, the identification information retrieve section 6 retrieves the identification information coincident with the identification information designated by the channel selection section 8. When there is the identification information coincident with the identification information designated by the channel selection section 8 within the identification information storage section 4, the identification information retrieve section 6 reads the address of the identification information coincident with the identification information designated by the channel selection section 8 and returns the address thus read to the channel selection section 8. The channel selection section 8 selects a communication channel from the channel list 7 by using the address thus returned. In this manner, the communication channel can be selected on the basis of the identification information.

Figure 4:
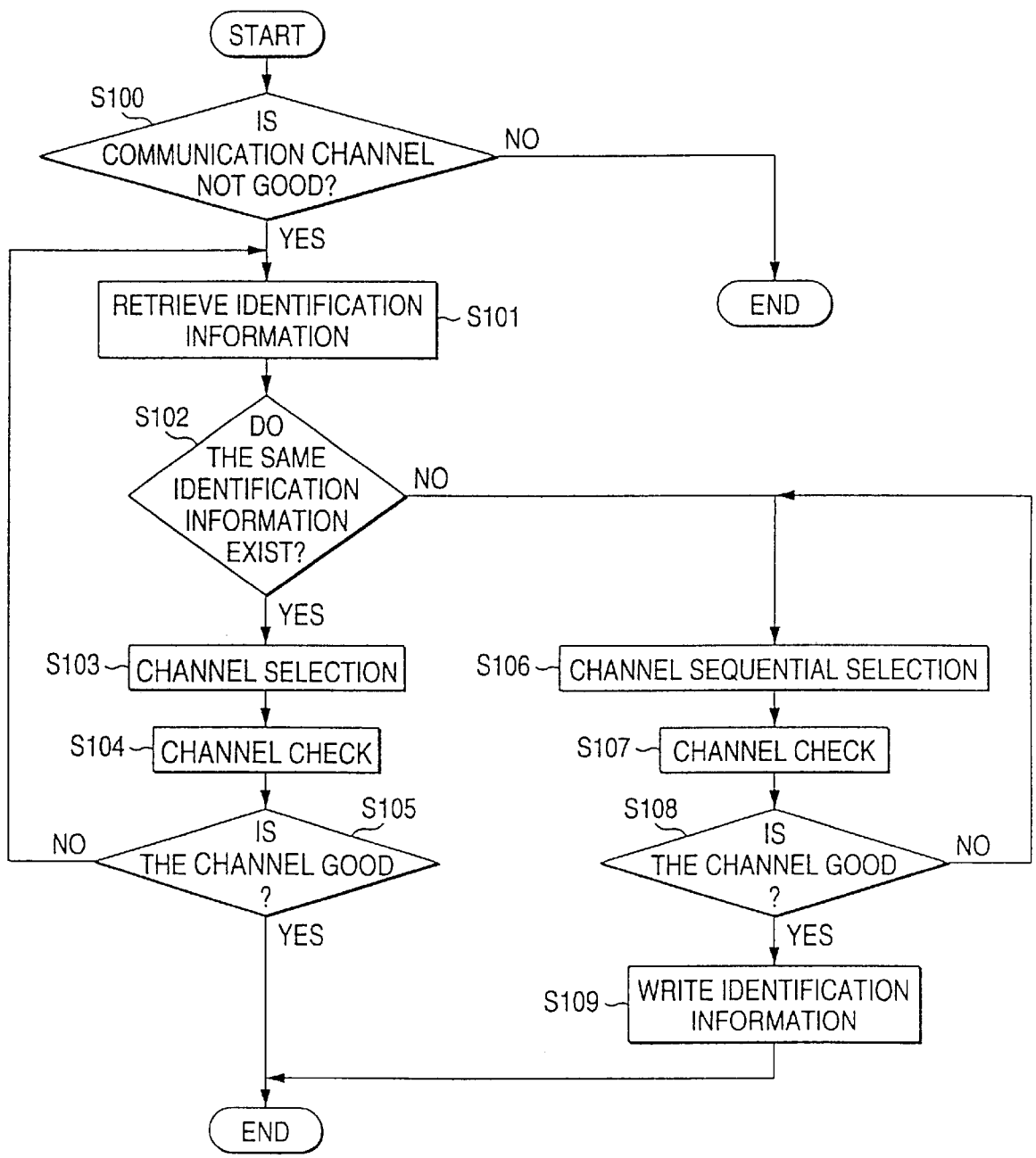
FIG. 4 is a flow chart of steps S100 to S109 showing an example of the operation of the mobile communication apparatus shown in FIG. 1 and showing the operation at the time of channel switching.

FIG. 4 is a flow chart of steps S100 to S109 showing an example of the operation of the mobile communication apparatus shown in FIG. 1 and showing the operation at the time of channel switching. First, the channel monitor section 3 detects a channel state of the communication channel being used (step S100). As a result of this detection, if it is determined that the channel state is good, the channel switching is not performed and the process is ended.

In contrast, if it is determined that the channel state is not good, the channel search is started (steps S101–S108). That is, on the basis of the detection result of the channel monitor section 3, the channel selection section 8 instructs the identification information retrieve section 6 to perform data retrieval. Thus, the identification information retrieve section 6 retrieves within the identification information storage section 4 the identification information coincident with the identification information on the communication channel having been acquired (step S101).

As a result of the detection, when the identification information coincident with that of the communication channel having been acquired is found within the identification information storage section 4, the address corresponding to the identification information thus found is read from the identification information storage section 4 and returned to the channel selection section 8 (step S102). The channel selection section 8 reads from the channel list 7 the channel information, that is, the frequency and the time slot of the communication channel selected by the address thus returned (step S103). The channel monitor section 3 detects the channel state of the selected communication channel from the information on the frequency and the time slot thus read (step S104).

As a result of the detection, if it is determined that the channel state of the selected communication channel is good, the process is ended (step S105). In contrast, if it is determined that the channel state of the selected communication channel is not good, the identification information retrieve section 6 starts the data retrieval again in response to the instruction from the channel selection section 8 (step S101). In this case, the data relating to the communication channels having been retrieved already is excluded from the subject of the data retrieval.

In the data retrieval process (step S101), if the same identification information is not found within the identification information storage section 4, the identification information retrieve section 6 sends the information representing that "corresponding data does not exist" to the channel selection section 8. In this case, the channel selection section 8 sequentially selects the communication channels from the channel list 7 in a predetermined order (for example, in the order of address) and sequentially detects the states of the selected communication channels. This process is sequentially repeated until the communication channel in a good channel state is found (steps S106 to S108).

When the communication channel in a good channel state is found as a result of the sequential retrieval of the communication channels (step S108), the identification information write section 5 writes the identification information extracted from the communication channel thus found into the identification information storage section 4 (step S109), then the communication channel switching process is ended.

Figure 5:
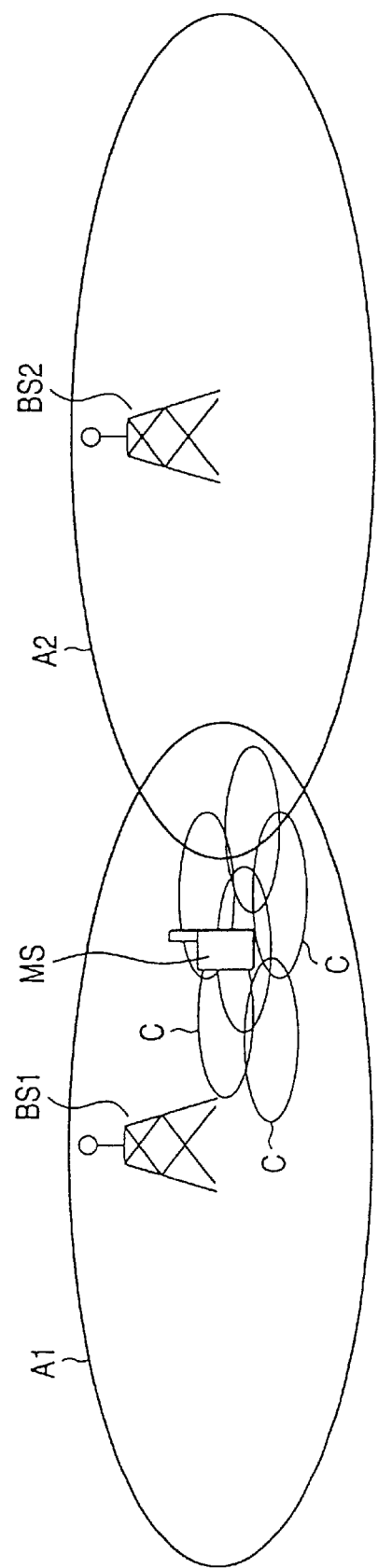
FIG. 5 is a schematic diagram showing an example of the system arrangement including the mobile communication apparatus according to the present invention.

FIG. 5 is a schematic diagram showing an example of the system arrangement including the mobile communication apparatus according to the present invention. This system is a terrestrial communication system. In this figure, MS indicates the mobile communication apparatus shown in FIG. 1. BS1 and BS2 earth stations serve as the system side communication apparatuses in the portable telephone system. And, A1 and A2 radio areas are covered with the earth stations BS1 and BS2. Each of the earth stations provides two or more different communication channels. Each of the radio areas A1 and A2 is formed by two or more cells C respectively corresponding to the communication channels. In other words, each of the radio areas A1 and A2 is further divided into the plurality of cells Cs. In this example, the earth stations BS1 and BS2 serve as the system side communication apparatuses for the mobile communication apparatus MS.

When the mobile communication apparatus MS moves at a low speed between the cells Cs, the channel state of the communication channel having been acquired degrades. Further, even when the mobile communication apparatus MS stands still within the cell C, there is a case that the channel state of the communication channel having been acquired degrades due to some reason. In this case, so long as the mobile communication apparatus MS exists within the radio area A1 covered by the earth station BS1, the mobile communication apparatus MS can communicate with the earth station BS1 with a high possibility by using another communication channel.

In the case where an earth station differs from another earth station in services or channel charges, if the mobile communication apparatus acquires another communication channel provided by the earth station same as the earth station which have provided the communication channel having been used, the mobile communication apparatus can obtain the same service as that having been obtained heretofore. Accordingly, it is not necessary to determine at every channel switching whether or not the earth station providing a new communication channel after switching is an earth station providing the service desired by a user. For example, it is not necessary to determine at every channel switching whether or not the new communication channel after switching is one capable of connecting to a network desired by a user or one of cheep channel charge.

In this manner, if the mobile communication apparatus MS selects a communication channel provided by the earth station BS1 in preference to communication channels of another earth station at the time of channel switching, the channel switching can be completed in a short time. In particular, the time required for the channel search can be shortened to a large extent in the communication system where the channel information from the earth station does not include the information on neighboring cells.

The identification information storage section 4 may be arranged by the storage means similar to the channel list 7 in a manner that the identification information on all the earth stations are stored in advance so as to be linked to the communication channels within the channel list 7. In this arrangement, it is also possible to select another communication channel provided by the same earth station. In this case, however, since a quite multiplicity of earth stations are provided in general, the identification information storage section 4 is required to be a memory with a large capacity in order to store the identification information on all the earth stations. Further, since an amount of data subjected to the retrieval by the identification information retrieve section 6 is much, the time required for the retrieval becomes also longer.

In contrast, according to the embodiment of the present invention, in the case where the channel state is good, the identification information on the earth station is extracted from the received signal and stored. That is, the mobile communication apparatus learns the information on the base station in accordance with the activity or moving range of a user. Thus, the mobile communication apparatus of this embodiment is convenient since it is not necessary to store the identification information on the earth station in advance. Further, according to the embodiment, since the mobile communication apparatus stores only the identification information on the system side communication apparatus from which the mobile communication apparatus actually received signal, the identification information storage section 4 can be formed by a memory whose capacity is small.

Although, the present embodiment has been explained as to the case where the identification information storage section 4 and the channel list 7 are formed by the different storage means, the present embodiment may be modified in a manner that both the identification information storage section 4 and the channel list 7 are formed by a common writable storage means.

SECOND EMBODIMENT

Figure 6:
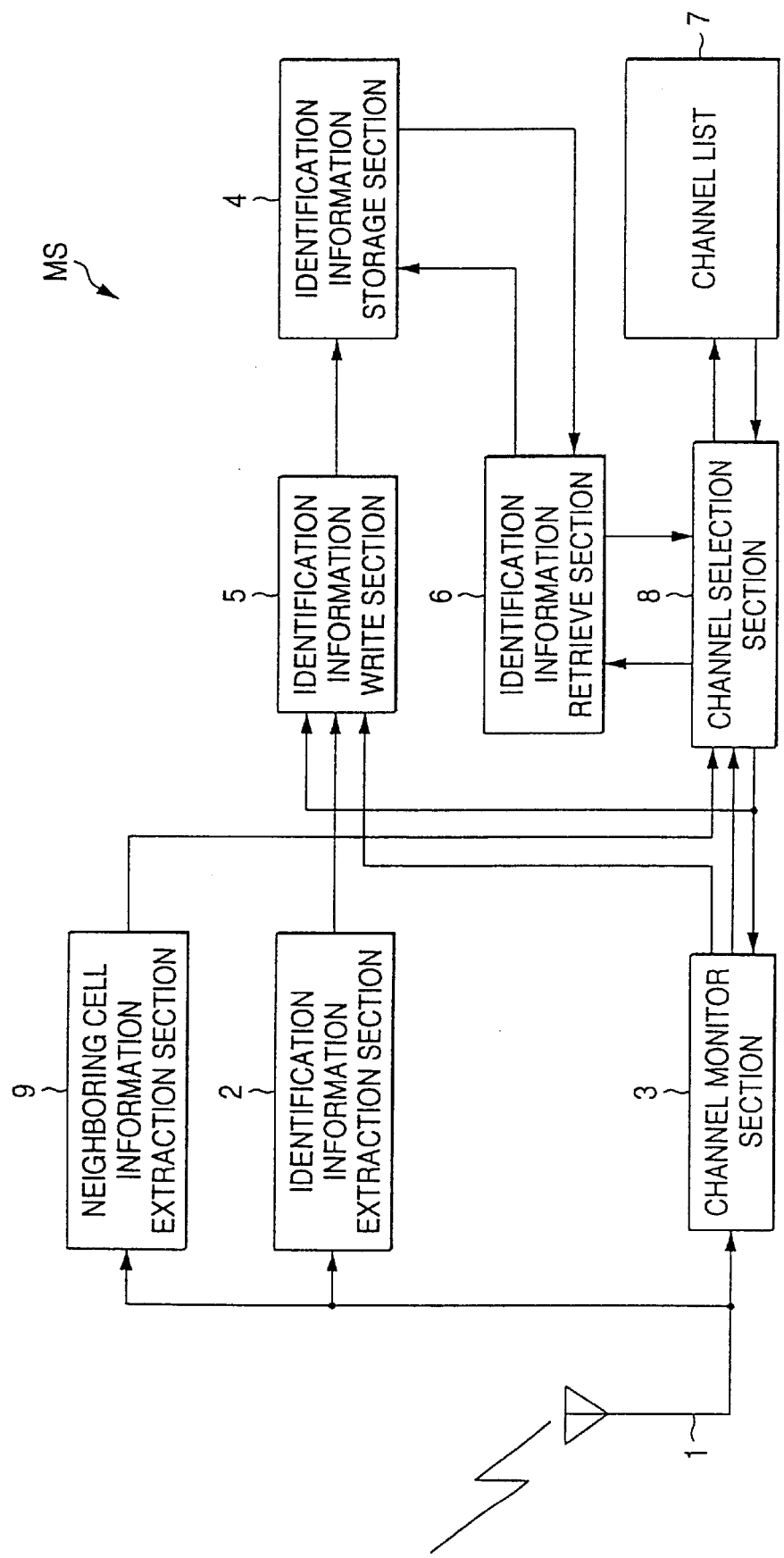
FIG. 6 is a block diagram showing an example of another arrangement (second embodiment) of a mobile communication apparatus according to the present invention.

FIG. 6 is a block diagram showing an example of another arrangement of the mobile communication apparatus MS according to the present invention. This mobile communication apparatus is arranged to further include a neighboring cell information extraction section 9 in addition to the arrangement of the mobile communication apparatus shown in FIG. 1. This mobile communication apparatus is employed in the communication system in which the channel information on a neighboring cell(s) is included within the channel information contained in the radio signal transmitted from the system side communication apparatus (for example, an earth station).

The neighboring cell information extraction section 9 extracts the channel information on a neighboring cell, that is, the frequency and the time slot in the case of the TDMA system, the frequency and the spreading code in the case of the CDMA system, from the channel information contained in the received signal at the time of call-waiting.

The channel selection section 8 receives the channel information on the neighboring cell from the neighboring cell information extraction section 9 and sequentially sends the channel information to the channel monitor section 3, which in turn detects the channel state.

At the time of call-waiting, the channel monitor section 3 monitors the radio signal transmitted from the system side communication apparatus. That is, the channel monitor section 3 repeatedly detects the channel state of the acquired communication channel (communication channel corresponding to the serving cell). The channel monitor section 3 also detects, during the intervals between the monitoring operations, the channel state of the communication channel of the neighboring cell designated by the channel selection section 8.

The identification information write section 5 writes the extracted identification information into the identification information storage section 4 on the basis of the output signals from the identification information extraction section 2 and the channel monitor section 3. In this case, the channel information on the communication channel designated by the channel selection section 8 is also written into the identification information storage section 4. That is, when the channel state of the detected neighboring cell is good, the extracted identification information is written into the identification information storage section 4 together with the information on the communication channel linked to the identification information. In this case, since the detection of the channel state is performed so as not to find a communication channel to be acquired but to extract the identification information on the system side communication apparatus, it is sufficient that the channel state is good to such a degree that the identification information can be extracted. Thus, the threshold level of the channel state determined to be good may be lower than that at the time of the channel switching.

Figures 7, 8:
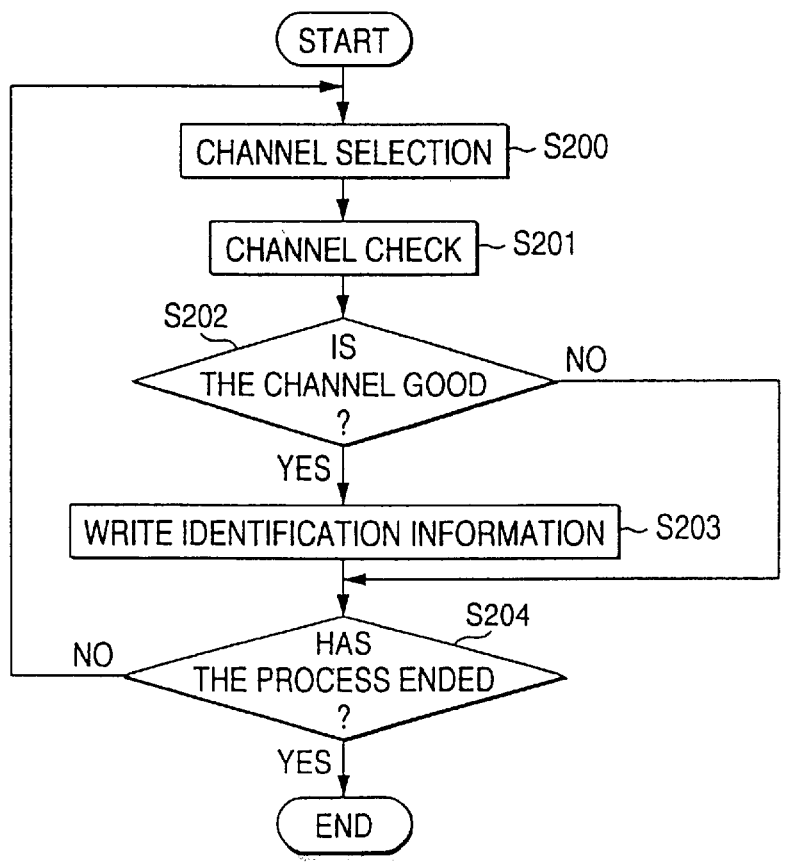
FIG. 7 is a diagram showing an example of the data arrangement forming a channel list 7 shown in FIG. 6.
FIG. 8 is a flow chart of steps S200 to S204 showing an example of the operation of the mobile communication apparatus shown in FIG. 6 and showing the operation performed in the intervals between the radio signal monitoring operations at the time of call-waiting.

FIG. 7 is a diagram showing an example of the data arrangement stored in the identification information storage section 4. The explanation will be made as to the case where the mobile communication apparatus MS is a portable telephone of the TDMA system. The respective data in this figure is formed by the combination of the frequencies {F1, F2, F3 - - - }, the time slots {T1, T2, T3 - - - } and the identification information {D1, D2, D3 - - - }. The respective data correspond to the communication channels of which channel states were detected as being good before, that is, correspond to the serving cells having been used and the associated neighboring cells of which channel states have been good. According to the present embodiment, only the information relating to the communication channels from which the identification information can be extracted are written, and so such data shown in FIG. 3A in which identification information is not obtained is not stored.

FIG. 8 is a flow chart of steps S200 to S204 showing an example of the operation of the mobile communication apparatus MS according to the embodiment. This flow chart shows operations performed in intervals between the radio signal monitoring operations by the channel monitor section 3 at the time of call-waiting where the channel switching of the communication channels is not performed.

First, the channel selection section 8 selects one communication channel from the communication channels of the neighboring cell extracted by the neighboring cell information extraction section 9 (step S200). The channel monitor section 3 detects the channel state of the communication channel thus selected (step S201). As a result of the detection, if the channel state of the selected communication channel is good to such a degree sufficient for extracting the identification information (step S202), the identification information write section 5 writes into the identification information storage section 4 the identification information extracted by the identification information extraction section 2 and the channel information from the channel selection section 8 so as to link the identification information to the channel information (step S203).

As a result of the detection of the channel state, when it is determined that the channel state of the selected communication channel is not good (step S202) or when the writing operation into the identification information storage section 4 has been completed (step S203), if there is a communication channel of other neighboring cell, the similar operation is performed as to this communication channel (steps S200 to S203). In this manner, when the aforesaid operation has been performed as to all the neighboring cells, the process shown in this figure is ended (step S204).

The aforesaid process is required to be performed in the intervals between the radio signal monitoring operations at the time of call-waiting. Accordingly, when monitoring the radio signal or operating the mobile communication terminal (for example, a user starts calling), this process is immediately ended.

Next, the operation at the time of channel switching will be explained. At the time of the channel switching, the identification information retrieve section 6 retrieves the identification information stored within the identification information storage section 4. That is, the identification information retrieve section 6 retrieves the identification information coincident with the identification information designated by the channel selection section 8. When there is the identification information coincident with the identification information designated by the channel selection section 8 within the identification information storage section 4, the identification information retrieve section 6 reads the channel information on the communication channel linked to the coincident identification information, for example, the frequency and time slot, from the identification information storage section 4 and returns the channel information thus read to the channel selection section 8.

The channel selection section 8 sends the channel information on the linked communication channel thus read to the channel monitor section 3, which in turn checks the channel state of the linked communication channel. As a result of the checking, if it is determined that the channel state of the linked communication channel is not good, the identification information retrieve section 6 further repeats the retrieval operation of the identification information. When there is no communication channel linked to the coincident identification information or when none of all the communication channels linked to the coincident identification information are good in their channel states, the channel selection section 8 sequentially selects the communication channels from the channel list 7 and the channel monitor section 3 checks the channel states of the communication channels thus selected. Thus, the operation of the present embodiment at the time of channel switching will be the same as the flow chart shown in FIG. 4.

Although, in the present embodiment, the detection of the channel states and the writing of the identification information are performed as to the communication channels of neighboring cells, the detection of the channel states and the extraction of the identification information may be performed as to the communication channels other than neighboring cells in the intervals between the radio signal monitoring operations based on the channel list 7. In this case, much more identification information can be obtained.

The present embodiment has been explained as to the case where the mobile communication apparatus is applied to a system wherein the radio signal from the system side communication apparatus includes the channel information on the neighboring cell. However, the mobile communication apparatus according to the present invention may be applied to a system wherein the radio signal does not include the channel information on the neighboring cell. For example, the channel selection section 8 may sequentially select the communication channels other than the acquired communication channels based on the channel list 7 in the intervals between the radio signal monitoring operations, and detection of the channel states and extraction of the identification information may be performed therefrom.

THIRD EMBODIMENT

Figure 9:
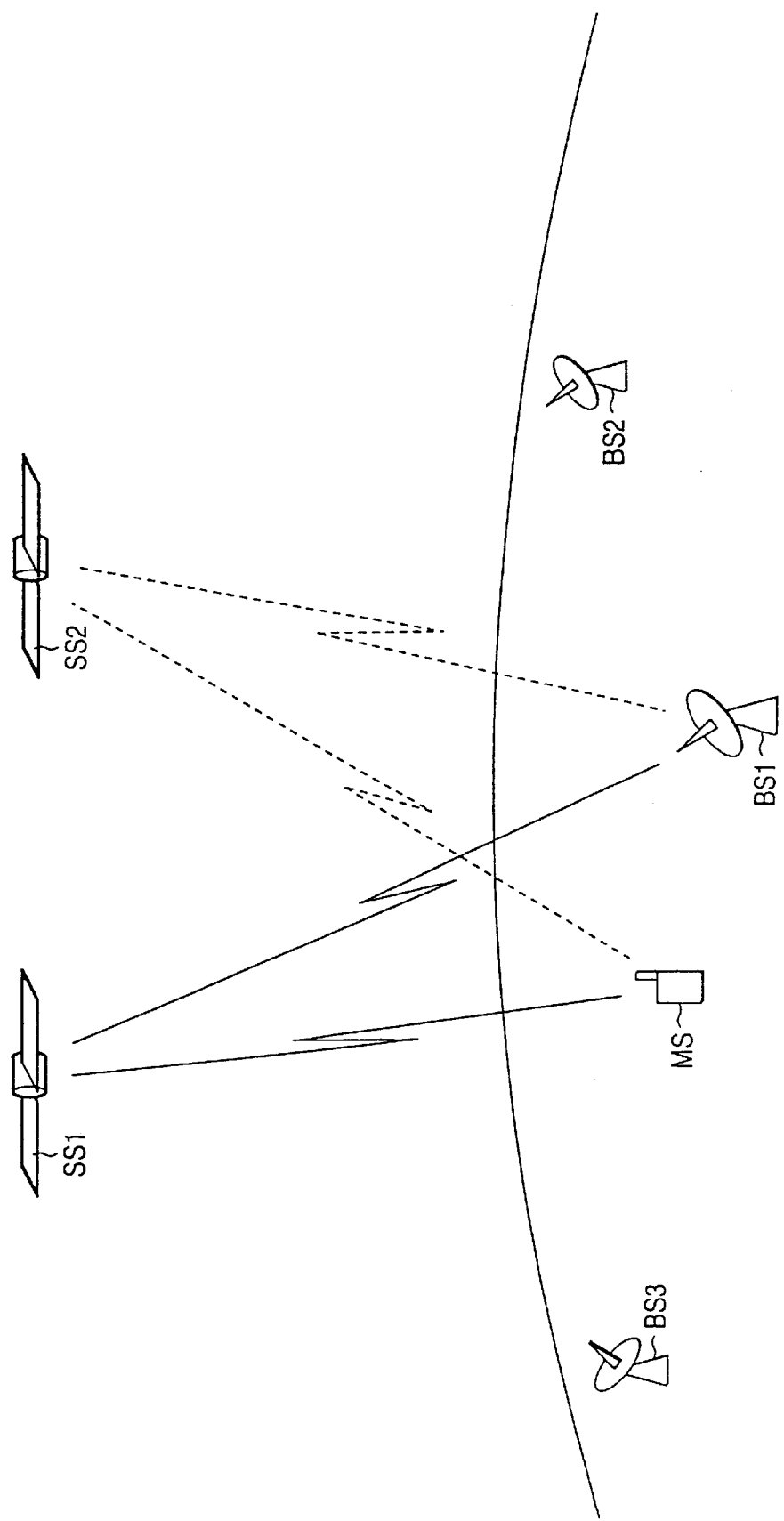
FIG. 9 is a schematic diagram showing another example (third embodiment) of the system arrangement including the mobile communication apparatus according to the present invention.

FIG. 9 is a schematic diagram showing another example of the system arrangement including the mobile communication apparatus according to the present invention. Each of the first and second embodiments has been explained as to the case where the present invention is applied to a terrestrial communication system in which a mobile communication apparatus performs radio communication directly with an earth station. The present embodiment will be explained as to the case where the present invention is applied to a satellite communication system in which a mobile communication apparatus communicates with an earth station through a communication satellite. In FIG. 9, MS indicates the mobile communication apparatus shown in FIGS. 1 and 6. SS1 and SS2 indicate communication satellites, and BS1 to BS3 earth stations. The radio area (not shown) covered by each of the communication satellites SS1 and SS2 is formed by two or more cells (not shown) corresponding to different communication channels. In this example, the earth stations BS1 to BS3 serve as the system side communication apparatuses for the mobile communication apparatus MS.

In this satellite communication system, the frequencies and the time slots of the radio signal transmitted from the communication satellites SS1 and SS2 to the mobile communication apparatus MS are determined by the earth stations BS1 to BS3. The radio signal includes the identification information on the earth station as the channel information. Accordingly, if the identification information on the earth station is extracted and stored in correspondence with the communication channel, it is possible to search the communication channels provided by the same earth station.

In the case where the communication channel by way of the communication satellite provided by the earth station is being acquired, even if the channel state of this communication channel degrades by some reason, the positional relation between the earth station and the mobile communication apparatus does not change largely so long as the mobile communication apparatus MS stands still or moves at a low speed. Thus, a different communication channel provided by the same earth station can be acquired with a high possibility.

For example, when the communication satellite SS1 is a mobile satellite which is different from a geostationary satellite, since the position of the cell itself moves as a time goes on, the channel state of the communication channel degrades even if the mobile communication apparatus MS stands still. Further, there is a case that the mobile communication apparatus MS moves between the cells within the radio area or moves out of the radio area due to the movement of the mobile communication apparatus MS, so that the channel state of the communication channel degrades. In this case, however, so long as the positional relation between the earth station and the mobile communication apparatus does not change largely, the mobile communication apparatus can communicate with the earth station BS1 with high possibility through the communication satellite SS1 in the case of the movement between the cells or through the other communication satellite SS2 in the case of the movement out of the radio area.

In the case where the communication satellite SS1 is a geostationary satellite, there is also a case that the channel state of the communication channel degrades due to the failure of the communication satellite or the like. For example, there is a case that the function relating to the particular cell of the communication satellite SS1 stops or all the functions of the communication satellite SS1 stops thereby to degrade the channel state. However, the mobile communication apparatus can communicate with the earth station BS1 with a high possibility through the communication satellite SS1 in the case of the stop of the function relating to the particular cell or through the other communication satellite SS2 in the case of the stop of all the functions of the communication satellite SS1.

Further, if the communication channel is defined by the earth station BS1, the communication channel can be found by searching the communication channels of the same earth station BS1 even if the communication satellite is the same or different.

Thus, if the communication channel of the earth station BS1 is selected in preference to the communication channel of the other earth station at the time of channel switching, the channel switching can be completed in a short time. In particular, when the communication satellite SS1 is a mobile satellite, it is always necessary to sequentially switch the communication channels in accordance with the movement of the communication satellite SS1 even if the mobile communication apparatus stands still. Accordingly, the aforesaid technical merits of the present embodiment becomes remarkable particularly when the communication satellite SS1 is the mobile satellite.

FOURTH EMBODIMENT

The third embodiment is directed to the case where the mobile communication apparatus searches the communication channel based on the identification information on the earth station in the satellite communication system. In the fourth embodiment, the explanation will be made with reference to FIGS. 6 and 9 as to the case where the mobile communication apparatus searches the communication channel based on the identification information on the earth station and the communication satellite in the satellite communication system.

In the present embodiment, the communication satellites SS1 and SS2 and the earth stations BS1 to BS3 in FIG. 9 serve as the system side communication apparatuses. In this satellite communication system, the earth station BS1 transmits the radio signal containing an identification information as to BS1 to the communication satellite SS1, which in turn further adds identification information as to SS1 to the received radio signal and transmits the radio signal to the mobile communication apparatus MS. In other words, the channel information transmitted from the communication satellite SS1 includes both the identification information D1 of the earth station BS1 and the identification information E1 of the communication satellite SS1. Further, in the present embodiment, the identification information extraction section 2 in FIG. 6 extracts the identification information on the earth station and the identification information on the communication satellite from the received signal, and the identification information write section 5 writes into the identification information storage section 4, these identification information thus extracted so as to link these identification information to the communication channel.

The radio area covered by the communication satellite SS1 is in general formed by a multiplicity of cells of different communication channels. Thus, when the channel state of the communication channel degrades due to the movement of the mobile communication apparatus MS or the movement of the communication satellite SS1 as a mobile communication satellite, the probability of the cause of the degradation is higher in the case that the mobile communication apparatus MS moves between the cells within the radio area rather than the case that the mobile communication apparatus moves out of the radio area of the communication satellite SS1. That is, the degradation of the channel state is detected in most cases when the mobile communication apparatus MS merely moves between the cells within the radio area covered by the same communication satellite SS1. In such a case, since the same communication satellite SS1 can be used continuously, the good channel state can be obtained continuously with a high possibility.

Accordingly, when the channel state of the communication channel between the mobile communication apparatus and the earth station BS1 through the communication satellite SS1 degrades, firstly the data retrieval is performed on the basis of the identification information on the earth station BS1 such as the third embodiment. As a result, in the case where a communication channel corresponding to the identification information on the earth station can not be found, if the data retrieval is performed on the basis of the identification information on the communication satellite SS1, a communication channel in a good channel state can be selected in a short time.

FIG. 10 is a diagram showing an example of the data arrangement forming the identification information storage section 4 shown in FIG. 6. In this data arrangement, the identification information D1 to D3 of the satellite communications and the identification information E2 to E4 of the earth stations are stored so as to be linked to the channel information on the communication channels, that is, the frequencies and the time slots.

FIG. 10 shows an example of the data arrangement in the TDMA system. In the case of the CDMA system, the data is stored so as to be linked to the frequencies and the spreading codes. Alternately, like the data arrangement shown in FIG. 3, the identification information on the earth stations and the communication satellites may be stored together with the addresses within the channel list 7 so as to be linked to the communication channels.

When the channel selection section 8 designates the identification information on the earth station, the identification information retrieve section 6 retrieves the identification information on the earth station coincident with the designated identification information. In contrast, when the channel selection section 8 designates the identification information on the communication satellite, the identification information retrieve section 6 retrieves the identification information on the communication satellite coincident with the designated identification information.

At the time of the channel search, the channel selection section 8 firstly selects a communication channel of the same earth station and then selects a communication channel of the same communication satellite. In other words, the channel selection section 8 firstly instructs the identification information retrieve section 6 to perform the data retrieval by designating the identification information on the earth station. As a result of the retrieval, if a communication channel in a good channel state can not be retrieved, then the channel selection section 8 instructs the identification information retrieve section 6 to perform the data retrieval by designating the identification information on the communication satellite. In this manner, the channel search as to the same earth station is performed and then the channel search as to the same communication satellite is performed.

Figure 11:
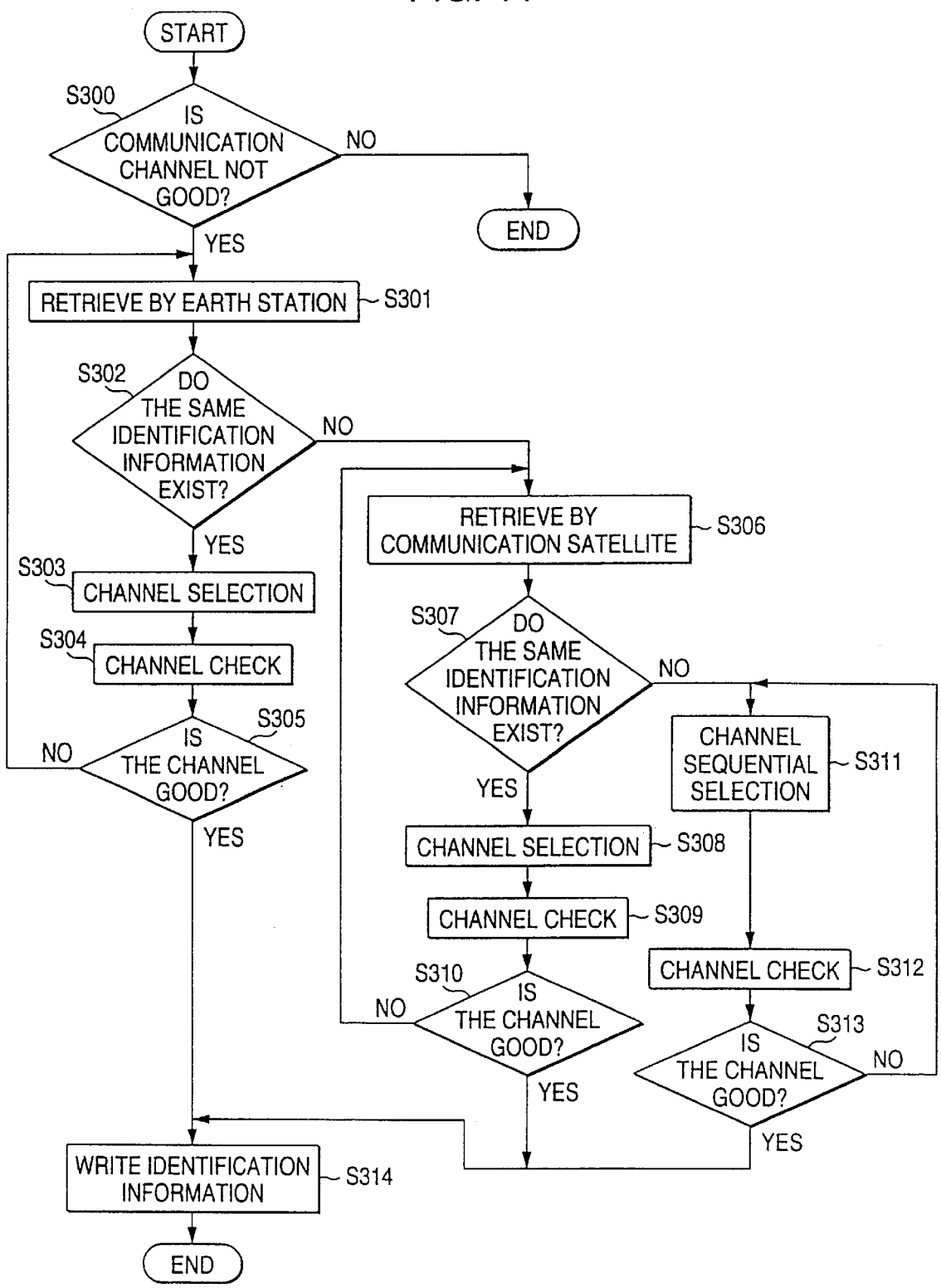
FIG. 11 is a flow chart of steps S300 to S314 showing another example of the operation of the mobile communication apparatus shown in FIG. 6.

FIG. 11 is a flow chart of steps S300 to S314 showing an example of an operation of the mobile communication apparatus according to the present embodiment. In this flow chart, as a result of the detection of the channel state of the communication channel being used by the channel monitor section 3, if it is determined that the channel state is not good, the channel search is started (step S300). The channel search is classified into the channel search relating to the earth station (steps S301 to S305), the channel search relating to the communication satellite (steps S306 to S310), and the sequential channel search (steps S311 to S313).

Firstly, the channel search relating to the earth station is performed. The identification information retrieve section 6 retrieves within the identification information storage section 4 the identification information coincident with the identification information on the earth station having been used (step S301). As a result of the retrieval, when the identification information coincident with that of the earth station having been used is found within the identification information storage section 4, the channel selection section 8 reads the corresponding frequency and time slot from the channel list 7, and the channel monitor section 3 detects the channel state of the corresponding communication channel (steps S302 to S305). This process is repeated until the communication channel in a good channel state is found.

When there is no identification information on the same earth station within the identification information storage section 4 or when none of all the communication channels corresponding to the coincident identification information thus found is in a good channel state, the channel search relating to the communication satellite is performed (step S302). That is, the identification information retrieve section 6 retrieves within the identification information storage section 4 the data coincident with the identification information on the communication satellite having been used (step S306). In this case, the data relating to the communication channels having been retrieved, that is, the data coincident with the identification information on the earth station is excluded from the subject to be retrieved. As a result of the retrieval, when the identification information coincident with that of the communication satellite having been used is found within the identification information storage section 4, the channel selection section 8 reads the information on the corresponding frequency and time slot from the channel list 7, and the channel monitor section 3 detects the channel state of the corresponding communication channel (steps S306 to S310). This process is repeated until the communication channel in a good channel state is found.

When there is no identification information on the same communication satellite within the identification information storage section 4 or when none of all the communication channels corresponding to the coincident identification information thus found is in a good channel state, the sequential channel search is performed (step S307). That is, the channel selection section 8 sequentially selects the communication channels from the channel list 7 in a predetermined order (for example, in order of address) and sequentially detects the states of the selected communication channels. This process is sequentially repeated until the communication channel in a good channel state is found (steps S311 to S313). In this case, the data relating to the communication channels having been retrieved, that is, the data coincident with the identification information on the earth station or the communication satellite is excluded from the subject of the channel search.

In this manner, when a communication channel in a good channel state is found (steps S305, S310 or S313), the identification information write section 5 writes the identification information on the earth station and the communication satellite thus extracted, and the process of the channel search is ended (step S314).

For example, supposing that the mobile communication apparatus MS acquires the communication channel which is provided by the earth station of the identification information D2 and by way of the communication satellite of the identification information E2, and the identification information storage section 4 stores the data shown in FIG. 10. In this state, when the channel state of the communication channel degrades, firstly the data retrieval is performed on the basis of the identification information D2 of the earth station serving as a retrieval key. As a result, the communication channel "F4 & T1" of the address 5 is selected and the channel state thereof is checked. When the channel state of the selected communication channel is not good, then the data retrieval is performed on the basis of the identification information E2 of the communication satellite. As a result, the communication channel "F1 & T2" of the address 2 is selected and the channel state thereof is checked.

What is claimed is:

1. A communication channel selecting method, comprising the steps of:
    extracting from a received signal over a communication channel, identification information of a system side communication apparatus which provides said communication channel;
    storing said extracted identification information in a memory linking said identification information to said communication channel, when said communication channel is determined to be in a state usable for communication;
    retrieving identification information stored in said memory, when it is determined that a state of a communication channel being used is unacceptable; and
    selecting a communication channel to be switched to to which said retrieved identification information is linked.

2. A communication channel selecting method as claimed in claim 1, wherein said retrieving step comprises retrieving identification information corresponding to identification information of a system side communication apparatus providing a communication channel being acquired.

3. A communication channel selecting method as claimed in claim 2, further comprising:
    detecting a channel state of a communication channel being acquired,
    wherein said retrieving step comprises retrieving on a basis of said detected channel state, identification information linked to a communication channel which is different from said communication channel being acquired.

4. A communication channel selecting method as claimed in claim 1, wherein said extracting step comprises extracting identification information on an earth station providing said communication channel.

5. A communication channel selecting method as claimed in claim 4, wherein said earth station provides said communication channel through a communication satellite.

6. A communication channel selecting method as claimed in claim 1, wherein said extracting step comprises extracting identification information on an earth station providing said communication channel through a communication satellite and identification information on said communication satellite.

7. A communication channel selecting method as claimed in claim 1, said method further comprising:
    extracting from said received signal corresponding to a communication channel being acquired, channel information on a neighboring communication channel,
    wherein said identification information extracting step includes extracting from a received signal corresponding to said neighboring communication channel, identification information on a system side communication apparatus which provides said neighboring communication channel.

8. A mobile communication apparatus, comprising:
    an identification information extractor for extracting from a received signal over a communication channel, identification information of a system side communication apparatus which provides said communication channel;

a memory for storing said extracted identification information in a memory and linking said identification information to said communication channel, when said communication channel is determined to be in a state usable for communication;

a memory retriever for retrieving identification information stored in said memory, when it is determined that a state of a communication channel being used is unacceptable; and a channel selector for selecting a communication channel to be switched to to which said retrieved identification information is linked.

9. A mobile communication apparatus as claimed in claim 8, wherein said memory retriever retrieves identification information corresponding to identification information of a system side communication apparatus providing a communication channel being acquired.

10. A mobile communication apparatus as claimed in claim 9, further comprising:

a channel monitor for detecting a channel state of a communication channel being acquired, wherein said memory retriever retrieves on a basis of said detected channel state, identification information linked to a communication channel which is different from said communication channel being acquired.

11. A mobile communication apparatus as claimed in claim 8, wherein said information extractor extracts identification information on an earth station providing said communication channel.

12. A mobile communication apparatus as claimed in claim 11, wherein said earth station provides said communication channel through a communication satellite.

13. A mobile communication apparatus as claimed in claim 8, wherein said information extractor extracts identification information on an earth station providing said communication channel through a communication satellite and identification information on said communication satellite.

14. A mobile communication apparatus as claimed in claim 8, further comprising:

a channel information extractor for extracting from a received signal corresponding to a communication channel being acquired, channel information on a neighboring communication channel, wherein said identification information extractor extracts from a received signal corresponding to said neighboring communication channel, identification information on a system side communication apparatus which provides said neighboring communication channel.

* * * * *